May 11, 1926.
B. A. TETZLAFF
CLAMP
Filed August 16, 1924
1,584,332
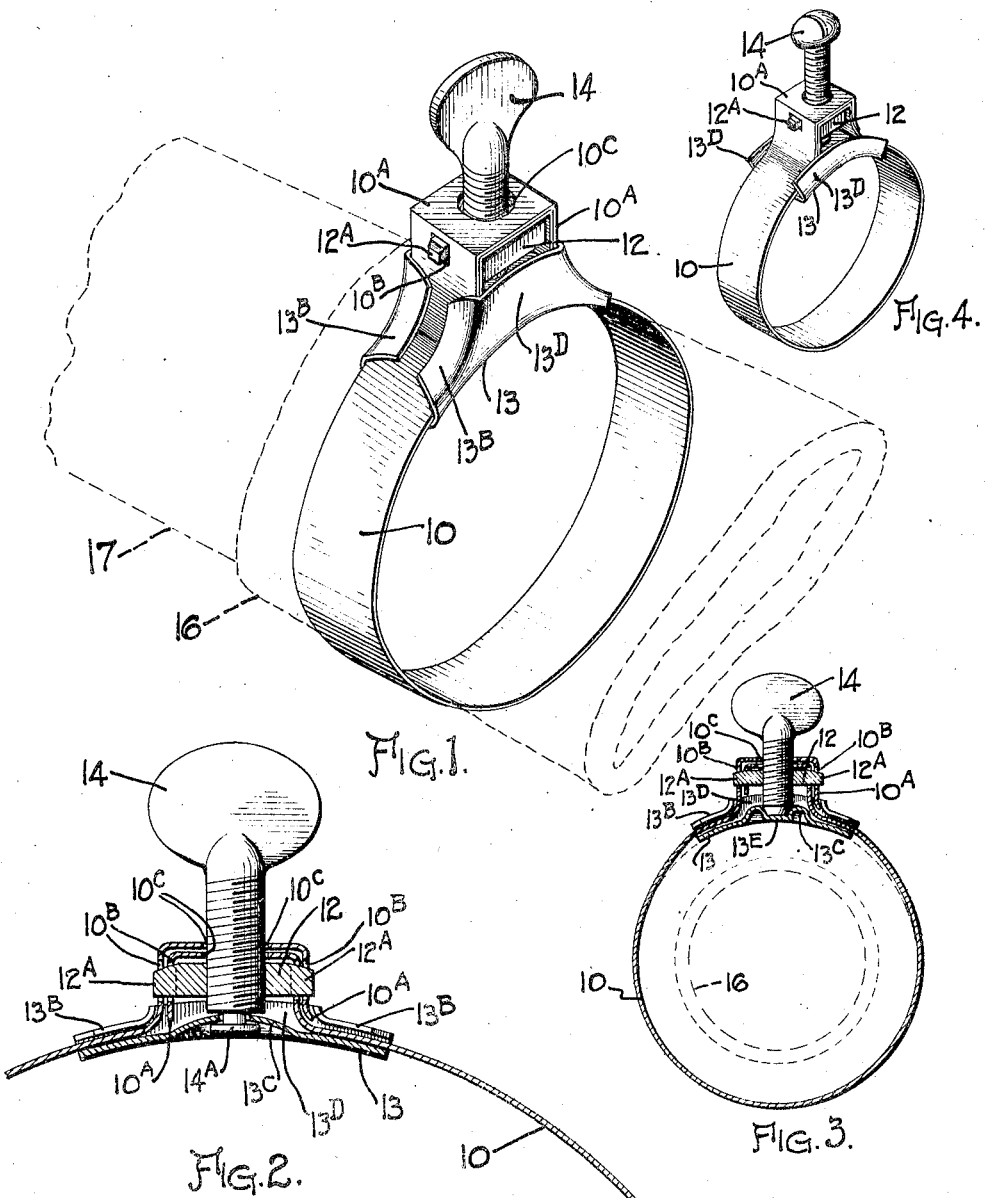

Patented May 11, 1926.

1,584,332

UNITED STATES PATENT OFFICE.

BENJAMIN A. TETZLAFF, OF BERWYN, ILLINOIS.

CLAMP.

Application filed August 16, 1924. Serial No. 732,352.

This invention relates to improvements in hose clamps.

An object of the invention is to provide a hose or pipe clamp in which, through simple manipulation of an adjusting screw, the entire circumference of the outer hose or pipe, and particularly the side walls of the same, are firmly gripped and pressed against the inner one.

It is also an object of the invention to provide a novel form of a hose clamp, which can be manufactured at very small expense, and which can be manipulated in a very simple way without auxiliary tools, for fastening two tubular members at their telescoping ends to each other.

With these and other objects in view, an embodiment of the invention is illustrated in the accompanying drawing, and is described in the following specification, the novel features being pointed out in the appended claims.

In the drawings:

Fig. 1 is a perspective view of the clamp;

Fig. 2 is an enlarged cross sectional view of tightening screw, bridge and over-lapping ends of the single band.

Fig. 3 is a cross section of the clamp showing a preferred modification wherein the tightening screw is detachably mounted to exert pressure on the bridge.

Fig. 4 is a perspective view of a clamp made for use on connections of comparatively small diameter having a bridge without the end arms which are not necessary in this type.

In the illustrations, the clamp is shown connecting two telescoping tubular members, namely, a flexible hose 16 and a pipe 17.

The clamp comprises a single piece of flexible metal band 10 having the ends 10<sup>A</sup> thereof bent to over-lap the winged nut 12 and both ends 10<sup>A</sup> having spaced openings 10<sup>B</sup> through which the wings or lugs 12<sup>A</sup> of the nut 12 project and whereby the nut 12 is positively retained against rotation during the tightening of the clamp by rotation of the tightening thumb screw 14.

The ends of the band 10 are further provided with comparatively large openings 10<sup>C</sup> arranged in alignment with the center of the nut 12. The thumb screw 14 extends through these openings 10<sup>C</sup> and has threaded engagement with nut 12. The foot end of the screw is provided with a constricted portion having a head 14<sup>A</sup> to provide a loose rotary connection of the screw within the portion 13<sup>C</sup> depressed from the under side of the bridge 13.

It is obvious now that by turning the thumb screw 14 in or out of the nut 12 will tighten or loosen the band 10 about the telescoping members 16 and 17.

For the purpose of securing the circumferential gripping engagement of the clamp with telescoping members 16 and 17 a bridge 13 is provided which supports and retains the ends of the clamp 10 close to the side walls of hose 16.

The bridge is provided with an arcuate base portion 13<sup>A</sup> which bridges the gap between the ends 10<sup>A</sup> and the clamp band 10.

The two side integral upright walls 13<sup>D</sup> have inwardly bent integral arms 13<sup>B</sup> which overlap the band ends and thus retain same to secure the circumferential gripping engagement of the clamp.

When the thumb screw 14 is rotated to tighten the clamp the foot end of the screw will press against the arcuate base 13<sup>A</sup> of the bridge and the nut 12, which is retained in the band ends from rotation, will rise and thus tighten the band 10.

To lower the cost of manufacture and to provide means for completely detaching the clamp, I have shown in my preferred modification in Fig. 3, a bridge 13 having the depressed portion 13<sup>C</sup> provided with a cup-like depression 13<sup>E</sup> within which the end of the screw 14 is movably supported and which construction permits the full withdrawal of the thumb screw 14 to afford the release of the band ends 10<sup>A</sup> from the nut 12.

In the clamp shown in Fig. 4 which is particularly made for connections of comparatively small diameter, the construction is similar to the clamp illustrated in Figs. 1 and 2, except that the bridge 13 is made with an arcuate base 13<sup>A</sup> and integral sides 13<sup>D</sup>. The arms 13<sup>B</sup> are omitted.

I claim:

1. In a clamp for connecting two telescoping members, the combination of a single flexible band of flat material adapted to embrace said telescoping members, said band having overlapping ends, a nut held between a bent portion of said overlapping ends, and a rotatable screw member extending through said ends of said band and through said nut and having threaded engagement with said nut for causing radial displacement of said nut with respect to the members to be clamped.

2. In a clamp a single flexible band of flat material, a bridge embracing the ends of said band, a nut held between a bent portion of said band ends, said nut having projections extending into the said band ends to hold said nut against rotation, and a screw extending through said ends and said nut and rotatably mounted at its inner end in said bridge.

3. In a clamp, adapted to embrace a tubular member, a single flexible band, a bridge embracing the end portions of said band, a nut mounted between said ends for non-rotation, said nut having means projecting through said overlapping ends to hold said nut against rotation, means co-operating with the bridge for adjusting the radial distance of said nut from the axis of the tubular members, and integral arms on said bridge embracing said legs for preventing spreading movement of the portions thereof near said bridge.

4. In a clamp, adapted to embrace a tubular member, a single flexible band having overlapping ends, a nut non-rotatably mounted between said ends, a bridge loosely engaging said legs at diametrically opposite ends, means for radially displacing said nut with respect to the axis of the tubular members, and arms on said bridge for preventing spreading movement of the flexible legs adjacent the bridge.

5. A clamp comprising a single flexible band, said band forming substantially a circle with a portion of the ends thereof bent outwardly and terminating in overlapping position, a nut held between said outwardly bent portions and said nut having means extending through said ends whereby said nut is positively held against rotation, the said overlapping ends having aligned openings, a screw extending through said openings into engagement with said nut, and a bridge loosely embracing the end portions of said band and forming an abutment for said screw.

6. A clamp comprising a single flexible band having overlapping ends and portions of said ends bent outwardly, a nut held against rotation between said outwardly bent portions and lying beneath said overlapping ends, said nut being formed to prevent displacement of said overlapping end portions, a bridge loosely embracing the band on both sides of said bent portions, and a tightening screw extending through said overlapping ends and through said nut and being in abutment with said bridge.

7. In a clamp for connecting two telescoping members, the combination of a single flexible band adapted to embrace said members, said band having the ends thereof arranged to overlap each other, a nut adjacent said overlapped ends, said nut being arranged to retain said overlapped ends against lateral displacement, a bridge slidably retaining said band below said nut, and a screw extending through said overlapped ends and through said nut into abutment with said bridge.

8. A clamp as embodied in claim 7 and including said nut arranged to retain said overlapped ends against vertical displacement.

9. In a clamp for connecting two telescoping members, the combination of a single flexible band adapted to embrace said members, said band having the ends thereof arranged to overlap each other, a nut adjacent said overlapped ends, said nut being arranged to retain said overlapped ends against lateral displacement, a bridge spanning the gap between said band below said nut, and a screw extending through said overlapped ends and through said nut into abutment with said bridge.

10. A clamp as embodied in claim 9 and including said nut arranged to retain said overlapped ends against vertical displacement.

In witness whereof I affix my signature.
BENJAMIN A. TETZLAFF.